Figure 1:
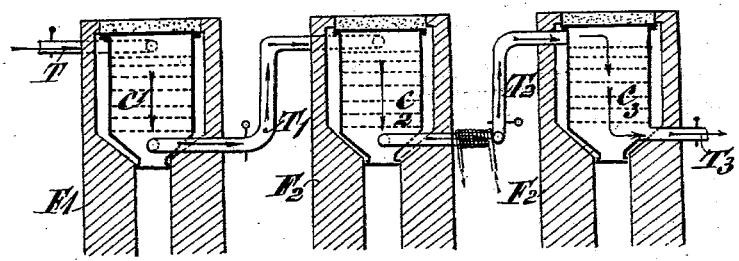

No. 751,941. PATENTED FEB. 9, 1904.
E. RAYNAUD & L. PIERRON.
PROCESS OF MAKING SULFURIC ANHYDRID.
APPLICATION FILED SEPT. 14, 1900.

NO MODEL.

Witnesses:
E. B. Bolton
Adelaide Claire Gleason

Inventors:
Emile Raynaud
Léon Pierron
By Richards & Co
their Attorneys.

No. 751,941.

Patented February 9, 1904.

UNITED STATES PATENT OFFICE.

EMILE RAYNAUD, OF SPY, AND LÉON PIERRON, OF JETTE ST. PIERRE, BELGIUM.

PROCESS OF MAKING SULFURIC ANHYDRID.

SPECIFICATION forming part of Letters Patent No. 751,941, dated February 9, 1904.

Application filed September 14, 1900. Serial No. 30,023. (No specimens.)

*To all whom it may concern:*

Be it known that we, EMILE RAYNAUD, a subject of the King of the Belgians, residing at Spy, and LÉON PIERRON, a citizen of the French Republic, residing at Jette St. Pierre, Belgium, have invented a certain new and useful Improvement in the Manufacture of Sulfuric Anhydrid by the Catalytic Process, of which the following is a specification.

This invention relates to the manufacture of sulfuric anhydrid without the use of leaden chambers by the means known as the "catalytic" method—that is, by means of substances or bodies acting as vehicles of contact; and the said invention has for its object to provide means for obtaining results in the manufacture of sulfuric anhydrid on a commercial scale as nearly as possible equal to theoretical results. The basis on which we work to attain this object is the observation that for a given gaseous mixture composed of given proportions of $SO_2$ and $O$ and with vehicles of contact of equal richness in platinum there is a certain temperature which is the most favorable for the combination. This observation has led us to devise a method or process giving the following results: First, we avoid overheating at the commencement of the operation; second, we obtain toward the end of the operation recombination of the elements which are dissociated in the course of the operation.

Our said process consists, essentially, in promoting at first the combination of a portion of the sulfurous acid with a portion of the oxygen, and then the combination of the remainder of these two gases, and, lastly, the recombination of such portions of the said gases as are liberated by decomposition of the acid formed. For this purpose substances of uniform richness being used, the temperature must be made to vary, so that the reaction of the gaseous mixture which may have been previously purified with the catalytic substances may take place in a first vessel at a temperature relatively low (say about 300° centigrade) that will cause the combination of a portion of the sulfurous acid with a portion of the oxygen, and then in a second vessel at a higher temperature (say about 500° centigrade) sufficient to complete the combination of the remaining portions of the sulfurous acid and even to cause some dissociation of the acid formed, and finally in a third vessel at a temperature (say about 400° centigrade) sufficient to cause a recombination of the gases that have been dissociated in the second vessel, but not sufficient to bring about a further decomposition. In this case the initial temperature being too low for complete combination of the gases in contact with the catalytic substances, the result of the increase of temperature attending the reaction is to produce a temperature more favorable to the combination of the gases without risk of overheating. The impoverished gases come afterward into contact with substances at a temperature suitable for the production of a complete combination followed by partial dissociation, and, finally, the dissociated gases recombine on reaching less heated parts without being liable to be further decomposed. For instance, the first catalytic vessel is continuously heated from the outside, and the gases containing sulfurous acid made to enter such vessel in a cold or slightly-heated condition, so that their temperature at the outlet reaches, say, about 300° centigrade. The second catalytic vessel is heated externally before the introduction of the gases at a temperature suitable to promote the reaction; but as soon as the latter are admitted the heating is discontinued and the operation allowed to proceed in the usual manner. The third catalytic vessel may either be externally heated or not. When it is not heated, the hot gases as they enter it come in contact with cold catalytic substances which take up part of their heat, and when they both attain a suitable temperature a further reaction takes place between the dissociated gases. It will, however, be found more convenient to heat the third catalytic vessel and to interpose between the second and third catalytic vessels some suitable cooling device. The heating is stopped as soon as the gases commence to flow in, and the conditions of temperature necessary to promote reaction between the dissociated gases are rapidly attained. The reaction causes a rise of temperature; but this is attenuated by the spreading of the heat into the colder substances placed farther from the inlet. However, the continuous addition of heat causes a progressive displacement of the zone of reaction toward the outlet of the vessel, and in order to avoid its reaching the last catalytic substances the vessel is replaced by another as soon as the thermometers show a temperature of, say, 400° centigrade near the outlet.

When the heating of the second and third catalytic vessels is stopped, care should be taken to close all the openings of the furnace and chimney that might cause a draft of air and external cooling of the vessels.

Figure 2:
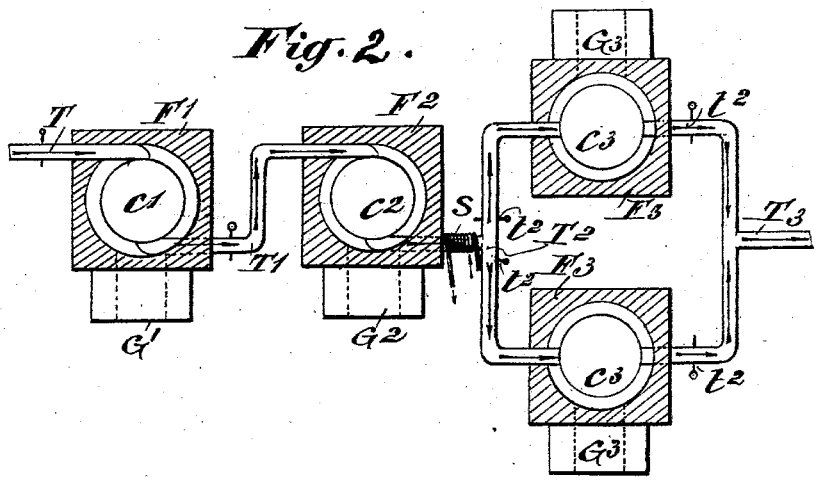

In the accompanying drawings, Figures 1 and 2 represent, in vertical and horizontal sections, respectively, a set of ovens $F'$ $F^2$ $F^3$ suitable for carrying our invention into practice. Each of the ovens contains a cylindrical vessel in which are superposed seeves, upon which are placed the contact substances of uniform richness in platinum—say ten per cent., for instance. The ovens are at a distance from one another, and each of them is heated separately by furnaces $G'$ $G^2$ $G^3$, as represented, or by means of hot gases. The sulfurous gases enter through a pipe T into the upper part of the first vessel $C'$, from the lower part of which they pass through a pipe $T'$ into the upper part of the second vessel $C^2$. They leave this second vessel at the lower part and pass into the upper part of the third vessel $C^3$ through a pipe $T^2$, wherein they may be cooled by cold air or cold water, which is caused to circulate through a coiled pipe S, arranged around the said pipe $T^2$ or by any other suitable means. From the lower part of the third vessel $C^3$ the gases pass out through a pipe $T^3$ leading to the condensing apparatus. In order to avoid a rise of temperature in the third vessel sufficient to cause dissociation of the sulfuric anhydrid formed, two similar vessels $C^3$, located in separate ovens $F^3$, may be both connected to the second vessel $C^2$, as shown in Fig. 2, and by means of dampers $t^2$ $t^2$ the gases may be caused to pass through the second vessel $C^3$ when the rise of temperature due to the reaction in the first of the vessels $C^3$ reaches the bottom of the latter. Thus, for instance, if the contact of the gases with the catalytic substances is to take place in the third vessel at a temperature of about 400° centigrade the gases will be caused to pass into the spare vessel $C^3$ whenever the temperature at the lower seeve of the other vessel $C^3$ reaches 400° centigrade.

The vessels are provided with movable covers having suitable openings for the passage of controlling apparatus.

To prevent undue cooling of the vessels, a layer of insulating material is placed over the covers. Suitable openings may be arranged through the walls of the ovens and vessels (as in the Hargreaves apparatus for the manufacture of soda) to allow of the introduction of thermometers for verifying the temperature at different parts of the vessels.

The vessels are preferably of a truncated conical form at their lower part, which is provided with a movable lid to allow the withdrawal of dust and impurities.

It is obvious that instead of using porous substances containing platinum other known vehicles of contact may be used, such as substances containing oxids of chrome, of iron, of copper, and the like.

Having fully described our invention, what we claim, and desire to secure by Letters Patent, is—

1. A process for the manufacture of sulfuric anhydrid by means of vehicles of contact of uniform catalytic action consisting in causing the gaseous mixture of sulfurous acid and oxygen at a temperature below the reaction temperature to come in contact, at first with a set of vehicles of contact at a comparatively low temperature, then with another set of vehicles of contact at a higher temperature and lastly with a further set of vehicles of contact again at a lower temperature.

2. A process for the manufacture of sulfuric anhydrid by means of vehicles of contact of uniform catalytic action consisting in causing the gaseous mixture of sulfurous acid and oxygen to come in contact with a first set of the said vehicles of contact at a comparatively low temperature for promoting partial combination of the said gases, then causing the partially-combined gases to come in contact with a further set of the said vehicles of contact at a higher temperature sufficient to complete the said combination and even to cause partial dissociation of the anhydrid formed and lastly causing the gases to come in contact with a still further set of the said vehicles of contact again at a lower temperature for causing recombination of the gases that may have become dissociated by the action of the second set of vehicles of contact.

In witness whereof we have hereunto set our hands in presence of two witnesses.

EMILE RAYNAUD.
LÉON PIERRON.

Witnesses:
H. T. E. KIRKPATRICK,
GREGORY PHELAN.